Figures 1, 2, 3:
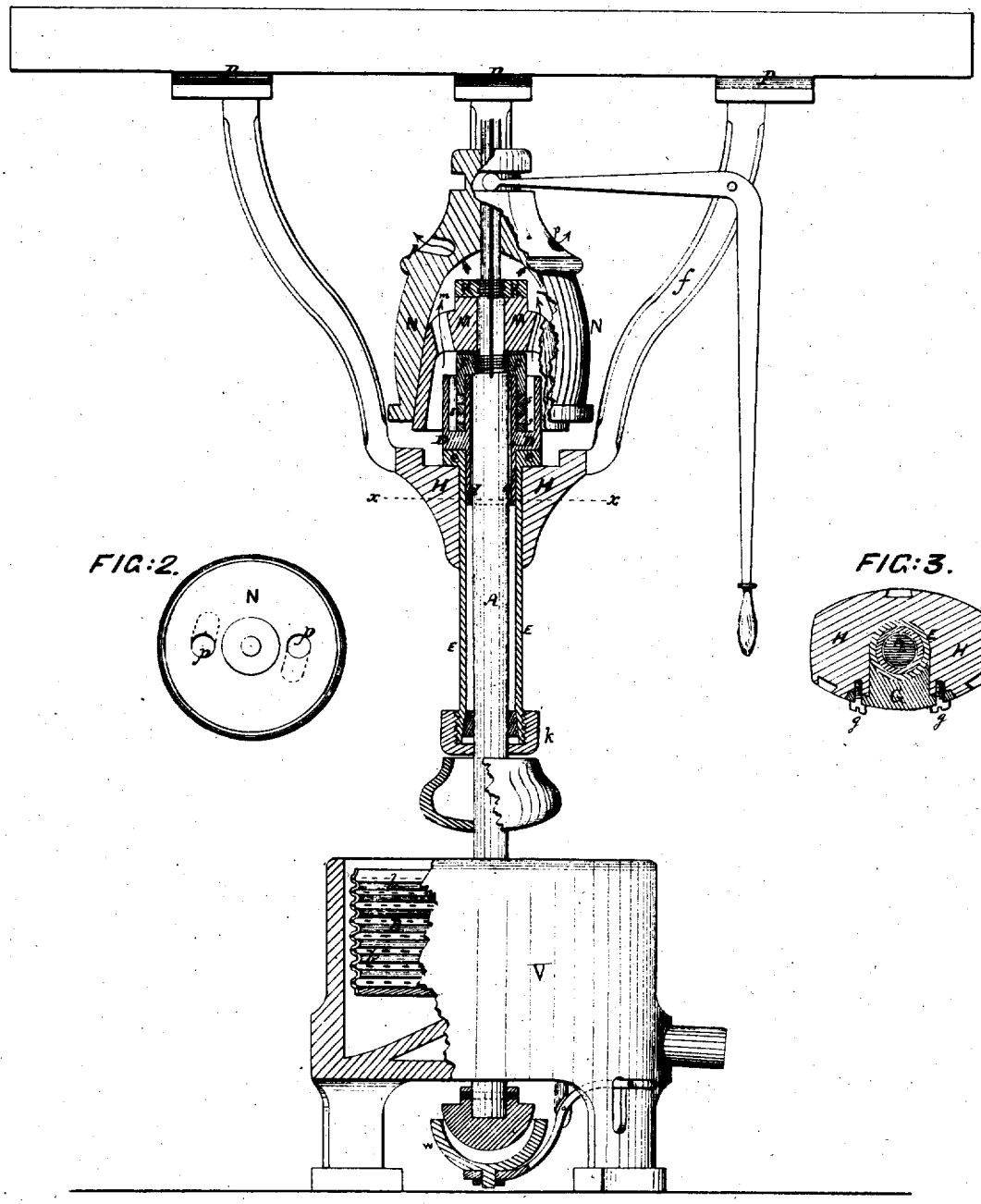

H W & R LAFFERTY

*Centrifugal Draining Machine*

4247

REISSUED JAN 31 1871

Witnesses
J. M. Burr.
Joseph Bartz

Hugh W. Lafferty
Robert Lafferty Inventors
By David A. Burr Atty

UNITED STATES PATENT OFFICE.

HUGH W. LAFFERTY AND ROBERT LAFFERTY, OF GLOUCESTER CITY, N. J.

IMPROVEMENT IN CENTRIFUGAL SUGAR-DRAINING MACHINES.

Specification forming part of Letters Patent No. 88,185, dated March 23, 1869; Reissue No. 4,247, dated January 31, 1871.

DIVISION A.

*To all whom it may concern:*

Be it known that we, HUGH W. LAFFERTY and ROBERT LAFFERTY, of Gloucester City, in the county of Camden and State of New Jersey, have invented new and useful Improvements in Self-Balancing Centrifugal Draining-Machines, of which the following is a specification.

Our invention relates to the following improvements in the construction of suspended centrifugal draining-machines, viz: first, the combination of a compound cone friction-pulley with the main supporting and driving spindle of the machine, to facilitate starting and stopping the same; second, a novel combination and arrangement of the cone friction-pulley, the main driving-pulley, and the belt connecting the two, so that when the friction-pulley is lifted and disengaged the driving-belt shall be relieved from tension and consequent wear; third, the combination and arrangement of obliquely-disposed air-vents in the cone friction-pulley with an air-space over the oil-cup, containing the bearings of the spindle, to keep the same at all times cool; fourth, an improved oil-cup to contain and surround the bearings of the spindle, and the combination thereof with the spindle and its supports, so as to retain the oil about the bearings and prevent its waste or escape; fifth, an improved waste-oil cup having a contracted neck and enlarged bottom, to be secured upon the spindle below its bearings, so as to prevent any oil from getting into the sugar; sixth, elastic packing interposed between the foot of each hanger or support of the machine and the beam to which it is secured, for the purpose of lessening the amount of vibration transmitted to the buildings in which the machines are placed.

In the accompanying drawings, Figure 1 is a central vertical section of our self-balancing and self-centering centrifugal machine, portions thereof being in elevation; Fig. 2, a top view of cone friction-pulley, illustrating the air-vents therein; and Fig. 3, a transverse section in the line *x x* of Fig. 1.

A represents the shaft or spindle which supports and carries the basket or drum B of our machine. This basket B is made by preference of thin sheet metal corrugated circumferentially, and having numerous apertures, *b b*, pierced along the corrugations in the outer curves thereof, to permit a free egress of liquids from the basket.

V is an outer casing, of the usual form, inclosing the basket. The spindle A passes centrally through the bottom of the basket, which is secured thereto in the usual manner.

D is an annular oil-cup fitted upon the upper portion of the spindle. The bottom of the cup is extended to form a sleeve, *d*, which embraces the spindle closely. Within this oil-cup are placed washers *s s*, constituting the bearings of the spindle A, whereon it revolves, as hereinafter more fully set forth.

E is a hollow shaft, whose inner diameter is equal to the extreme diameter of the sleeve *d* of the oil-cup D. This hollow shaft is made to inclose the spindle A below the oil-cup D, whose sleeve is embraced by its upper end, as shown in Fig. 1. A flange, *e*, is formed around its upper end equal in diameter to that of the oil-cup, and the bottom of said cup rests thereon. The hollow shaft E is supported from its flange *e* in a tripod-hanger, H, suspended from beams above by its three arms, *f f f*. A vertical slot is cut in the body of the hanger to admit the shaft E, which may thus be inserted and removed at pleasure without removing the hanger from its attachments. A key-plate, G, (see Fig. 3,) is then inserted in the slot and fastened down upon the shaft E by means of screw-bolts *g g*.

P P are strips of india-rubber or other elastic packing interposed between the arms *f f f* and the beams to which they are secured.

A screw-thread is cut upon the spindle A above the oil-cup D, to engage a hollow nut, F, whose annular flange projects downward into the annular cup D and rests therein upon a number of annular washers, *s s s*, whose width is so much less than the width of the annular space within the cup as to leave an oil-space between their outer circumference and its outer side, as shown in the drawings, Fig. 1. Thus the spindle A and its basket B are suspended by means of the hollow nut F upon the washers *s s* in the oil-cup D, which rests upon the flange *e* of the hollow shaft and is thereby supported in the hanger H. By increasing the number of interposed washers *s s s* the friction upon each is lessened.

M N is a hollow cone friction-pulley by which motion is imparted to the spindle A. The inner division, M, of this pulley is slipped down upon the spindle far enough to rest upon the nut F and to completely inclose and cover the oil-cup D below the same. It is firmly secured and held in place by means of a second nut, K, engaging a screw-thread cut on the spindle, as illustrated fully in Fig. 1. The upper or outer division, N, of the pulley is so made and formed interiorly as to coincide and engage with the lower cone, M, and yet leave an upper space, *m*, Fig. 2, between the two. Its outer face is formed in the usual manner to receive a driving-belt. Air-holes *p p*, Figs. 2 and 3 are pierced through the division N into this hollow space obliquely and tangentially to the circumference of the pulley in a direction opposite to the direction in which the spindle A is to revolve, as illustrated in Fig. 2; and similar apertures are also pierced from space through the head of the cone M into the space over the oil-cup D, so that the rapid revolution of the spindle will create a strong draft of air through said apertures, producing a current of air about and over the oil-cup D to keep the cup and its contents always cool, and thus prevent a rapid evaporation of oil therefrom. The head of the pulley M N is extended upward and grooved circumferentially to receive the forked end of a bent lever, R, Fig. 1, which is pivoted at *r*, so that a movement thereof shall elevate or depress the upper division, N, of the pulley and cause it to engage or be disengaged from its cone N. We contemplate so placing and arranging the driving-pulley carrying the belt encircling the cone friction-pulley M N as that when the friction-pulley is disengaged by the elevation of its upper division, N, the band shall be loosened, and thus saved, when the spindle is at rest, from the wear and tear incident to a constant tension thereof.

The lower end of the hollow shaft E is threaded to receive a hollow nut, *k*, which bears up against a divided washer, *t*, Fig. 2, closely encircling the spindle A, but provided with an outer conical face bearing against a conical seat formed in the inner surface of the shaft E, as shown in Fig. 2 of the drawings. A bearing and support is thus obtained between the lower end of the hollow shaft and the inclosed driving-spindle at this point.

Below the end of the hollow shaft E we secure a waste-oil cup, T, encircling the spindle A, to catch all waste oil flowing down the same and prevent it from passing into the contents of the basket below. The bottom of this cup is very greatly enlarged, while its rim or neck is contracted, as illustrated in the drawings, so as to prevent the oil from being thrown out by the centrifugal force created by the revolution of the spindle and cup. The bearings of the spindle within the hollow shaft, both above and below, are lubricated from an oil-cup, Q, on the upper end of the spindle, from which the oil passes down to the upper bearings in the oil-cup D, along a groove, *w*, cut in the spindle down to this point, as shown in Fig. 1, of the drawings, and from thence it passes down the surface of the spindle to the lower bearings in the washer *t*.

A brake, W, is applied to the lower end of the spindle A, which is made to project for this purpose beneath the casing V, as illustrated in Fig. 1. The brake is made of a ball-and-cup form, so as to operate as a check to prevent any undue movement of the spindle, as well as to arrest the revolution thereof when desired.

Our improved machine, constructed as described, possesses many advantages. Sufficient play is allowed therein to the lower end of the spindle to permit the basket to attain its equilibrium under the influence of an unequal distribution of its contents; but an excess of orbicular motion is prevented by the peculiar formation of the cup-brake. The use of rubber or other elastic packing in the bearings or to control or operate upon the moving parts of the machine is dispensed with, so that the wear incident thereto and the eccentricities produced by too free a movement of the operative parts are avoided. The small diameter of the spindle permits an elasticity therein sufficient to admit of such a deviation thereof from a true vertical line as a proper balancing of the basket to prevent a violent jarring thereof may demand. Thus the machine is self-balancing and self-centering in its movement. Although the spindle is elastic, it is so strengthened at its weakest point by the bearing at the lower end of the hollow shaft inclosing the same that all danger of a breakage thereof is avoided. By interposing an elastic packing between the supports of the machine and the beams to which they are secured even the slight jarring which will occur when the machine is first started is dissipated. By combining a friction-pulley with the spindle of each machine each machine is made independent of all others in all of its operations.

We claim as our invention—

1. The annular oil-cup D, when so combined with the spindle A as to support and inclose the bearings thereof, substantially as set forth.

2. An enlarged waste-oil cup, T, having a contracted rim or neck, and combined with the spindle or shaft of a centrifugal machine, substantially as herein set forth.

3. India-rubber or other elastic packing interposed between the supports of a centrifugal machine and the beams or base to which it is attached or from which it is supported, substantially as herein set forth.

4. The combination of a cone friction-pulley, M N, with the driving-spindle A of a suspended centrifugal machine, substantially as and for the purpose herein set forth.

5. The within-described combination and arrangement of the friction-pulley M N of the spindle A, the driving-pulley S, and connecting-band O, for the purpose herein specified.

H. W. LAFFERTY.
ROBERT LAFFERTY.

Witnesses:
DAVID A. BURR,
H. H. YOUNG.